(12) United States Patent
Wang

(10) Patent No.: US 12,115,558 B2
(45) Date of Patent: Oct. 15, 2024

(54) SORTING DEVICE

(71) Applicant: Beijing Jingdong Qianshi Technology Co., Ltd., Beijing (CN)

(72) Inventor: Jia Wang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 50 days.

(21) Appl. No.: 17/927,046

(22) PCT Filed: May 8, 2021

(86) PCT No.: PCT/CN2021/092253
§ 371 (c)(1),
(2) Date: Nov. 22, 2022

(87) PCT Pub. No.: WO2021/238613
PCT Pub. Date: Dec. 2, 2021

(65) Prior Publication Data
US 2023/0201881 A1 Jun. 29, 2023

(30) Foreign Application Priority Data

May 27, 2020 (CN) .......................... 202010462376.X

(51) Int. Cl.
*B07C 3/00* (2006.01)
*B07C 3/08* (2006.01)
(Continued)

(52) U.S. Cl.
CPC ................ *B07C 3/08* (2013.01); *B07C 3/003* (2013.01); *B07C 3/14* (2013.01); *B07C 5/36* (2013.01); *B65G 1/06* (2013.01); *B65G 1/1373* (2013.01)

(58) Field of Classification Search
CPC .. B07C 3/08; B07C 3/003; B07C 3/14; B07C 5/36; B65G 1/06; B65G 1/1373; B65G 17/345
(Continued)

(56) References Cited

U.S. PATENT DOCUMENTS 10,597,237 B2   3/2020 Itoh et al.
11,034,518 B2   6/2021 Ueda et al.
(Continued)

FOREIGN PATENT DOCUMENTS

CN   103449089 A   12/2013
CN   106516681 A    3/2017
(Continued)

OTHER PUBLICATIONS

International Search Report and Written Opinion for International Application No. PCT/CN2021/092253, dated Jul. 21, 2021, 7 pages.

*Primary Examiner* — James R Bidwell
(74) *Attorney, Agent, or Firm* — Buchanan Ingersoll & Rooney PC

(57) ABSTRACT

A sorting apparatus is provided. The sorting apparatus includes: at least one set of sorting units; where a sorting unit of the at least one set of sorting units includes: a timing belt, where two ends of the timing belt are fixed; a trolley track arranged in parallel with the timing belt; and a distribution trolley, where the distribution trolley comprises a driving assembly and a guide assembly, the driving assembly comprises a driving motor and a timing belt pulley, the driving motor drives the timing belt pulley to cooperate with the timing belt and move along the timing belt; and the guide assembly of the distribution trolley is configured to cooperate with the trolley track to guide a moving direction of the distribution trolley.

16 Claims, 5 Drawing Sheets

(51) Int. Cl.
    *B07C 3/14* (2006.01)
    *B07C 5/36* (2006.01)
    *B65G 1/06* (2006.01)
    *B65G 1/137* (2006.01)
(58) Field of Classification Search
    USPC .................................................. 198/370.06
    See application file for complete search history.
(56) References Cited

U.S. PATENT DOCUMENTS

| | | | |
|---|---|---|---|
| 11,273,979 B2* | 3/2022 | Frissenbichler | B66F 9/07 |
| 11,420,822 B2* | 8/2022 | Fjeldheim | B65G 1/0464 |
| 2008/0277243 A1 | 11/2008 | Hayduchok et al. | |
| 2018/0346242 A1* | 12/2018 | Grosse | B65G 1/0414 |
| 2018/0370726 A1 | 12/2018 | Grosse et al. | |
| 2021/0039887 A1 | 2/2021 | Zhu et al. | |
| 2024/0025646 A1 | 1/2024 | Ueda et al. | |

FOREIGN PATENT DOCUMENTS

| | | |
|---|---|---|
| CN | 107032035 A | 8/2017 |
| CN | 107499809 A | 12/2017 |
| CN | 207001568 U | 2/2018 |
| CN | 107954141 A | 4/2018 |
| CN | 106219125 B | 6/2018 |
| CN | 108438705 A | 8/2018 |
| CN | 109720767 A | 5/2019 |
| CN | 209177372 U | 7/2019 |
| CN | 110386393 A | 10/2019 |
| CN | 209684570 U | 11/2019 |
| CN | 209985803 U | 1/2020 |
| CN | 210304603 U | 4/2020 |
| CN | 111792269 A | 10/2020 |
| CN | 212607339 U | 2/2021 |
| EP | 1205266 A1 | 5/2002 |
| EP | 2121204 B1 | 10/2015 |
| JP | S5535753 A | 3/1980 |
| JP | H04-022407 U | 2/1992 |
| JP | H0723711 U | 5/1995 |
| JP | 2001072216 A | 3/2001 |
| JP | 2003192108 A | 7/2003 |
| JP | 2010515570 A | 5/2010 |
| JP | 2019202856 A | 11/2019 |
| WO | 0220376 A1 | 3/2002 |
| WO | 2016107562 A1 | 7/2016 |
| WO | 2019225234 A1 | 11/2019 |

* cited by examiner

SORTING DEVICE

CROSS-REFERENCE TO RELATED APPLICATIONS

This patent application is a U.S. National Stage of International Application No. PCT/CN2021/092253, filed on May 8, 2021, which claims the priority of Chinese Patent Application No. 202010462376.X, titled "SORTING APPARATUS" filed on May 27, 2020. The entireties of both applications are incorporated into this application by reference.

TECHNICAL FIELD

The present disclosure relates to the technical field of logistics, in particular to the technical field of parcel sorting, and more particularly to a sorting apparatus.

BACKGROUND

In recent years, the logistics automation industry has developed rapidly, and various sorting and transporting equipment emerge one after another. At present, sorting machines in the market are mainly for small and medium-sized goods, and are divided into two types: linear sorting machines and loop sorting machines.

When transporting and sorting a large number of small and medium-sized goods, the loop sorting machines and the linear sorting machines transport the goods through endless conveyor belts and linear conveyor belts, respectively. When setting up the loop sorting machines and the linear sorting machines, it requires a large floor space and a lot of resources.

SUMMARY

The purpose of the present disclosure is to propose a sorting apparatus.

An embodiment of the present disclosure provides a sorting apparatus, and the sorting apparatus includes: at least one set of sorting units; the sorting unit of the at least one set of sorting units includes: a timing belt, where two ends of the timing belt are fixed; a trolley track arranged in parallel with the timing belt; and a distribution trolley, where the distribution trolley includes a driving assembly and a guide assembly, the driving assembly includes a driving motor and a timing belt pulley, the driving motor drives the timing belt pulley to cooperate with the timing belt and move along the timing belt; and the guide assembly of the distribution trolley is configured to cooperate with the trolley track to guide a moving direction of the distribution trolley.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

The present disclosure will be further described in detail below with reference to the accompanying drawings and embodiments. It should be understood that the specific embodiments described herein are only used to explain the related disclosure, but not to limit the present disclosure. In addition, it should be noted that, for the convenience of description, only the parts related to the related disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1A:
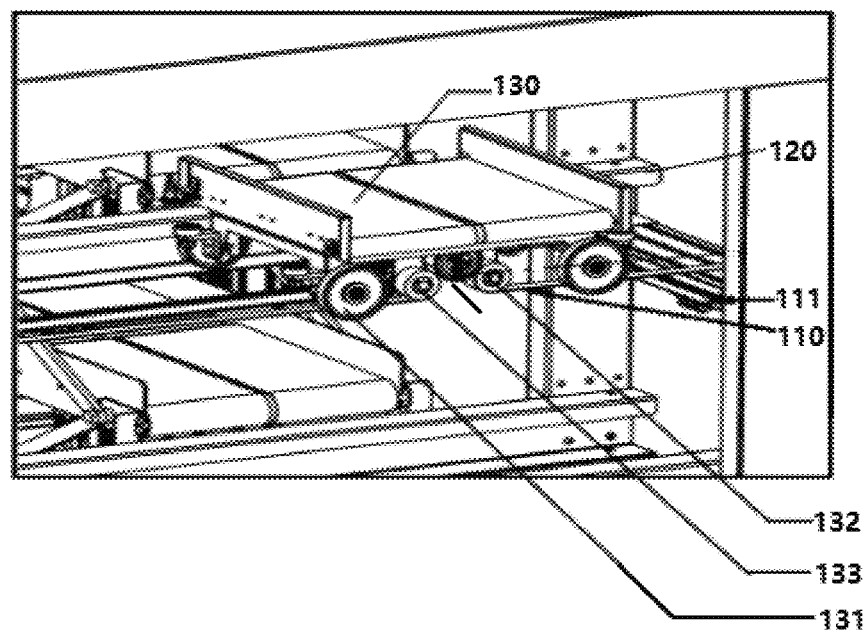
FIG. 1A is a schematic structural diagram of a sorting apparatus according to an embodiment of the present disclosure.
Figure 1B:
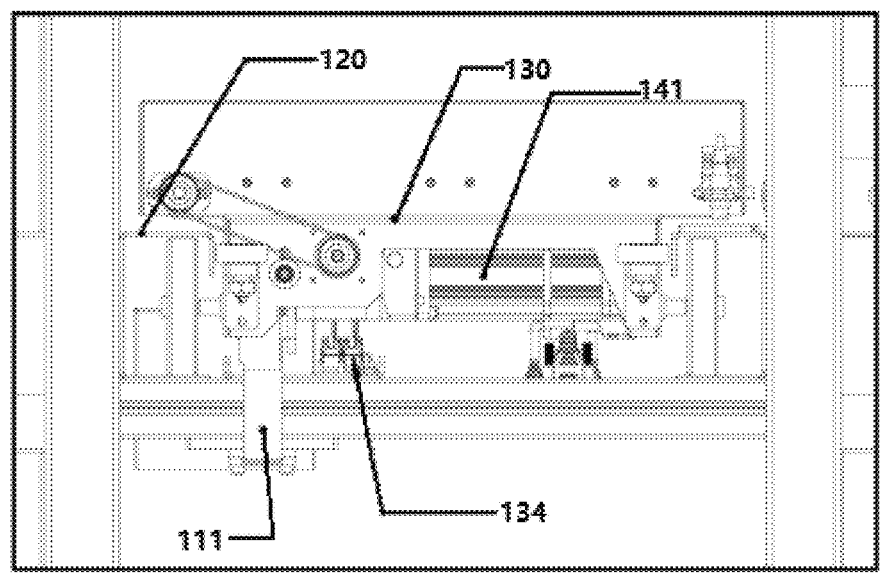
FIG. 1B is a side view of the schematic structural diagram of the sorting apparatus shown in FIG. 1A.

FIG. 1A illustrates a schematic structural diagram of a sorting apparatus according to an embodiment of the present disclosure, and FIG. 1B illustrates a side view of the schematic structural diagram of the sorting apparatus shown in FIG. 1A. The sorting apparatus includes: at least one set of sorting units 100; the sorting unit 100 includes: a timing belt 110, where two ends of the timing belt are fixed; a trolley track 120 arranged in parallel with the timing belt 110; and a distribution trolley 130, where the distribution trolley 130 includes a driving assembly and a guide assembly 131, the driving assembly includes a driving motor 141 and a timing belt pulley 142, the driving motor 141 drives the timing belt pulley 142 to cooperate with the timing belt 110 and move along the timing belt 110; and the guide assembly 131 of the distribution trolley is configured to cooperate with the trolley track 120 to guide a moving direction of the distribution trolley 130.

In the present embodiment, in the sorting apparatus, one or more sets of sorting units may be arranged, and the sorting unit is the smallest unit to achieve the purpose of the present disclosure. Using one set of sorting units 100 as an example, the sorting unit includes the timing belt 110 whose two ends are fixed, the trolley track 120 and the distribution trolley 130. Here, the trolley track 120 is fixed with the timing belt, and the distribution trolley 130 further includes the driving assembly and the guide assembly 131.

Specifically, the timing belt 110 is generally a belt-like object with a wire rope or glass fiber as a strong layer and covered with polyurethane or neoprene. Of course, the material and the shape of timing belt 110 may alternatively a material and a shape in the existing technology or in a future technology, which is not limited in the present disclosure.

The timing belt 110 cooperates with the timing belt pulley 142 to achieve the purpose of transmission. The cooperation approach may be selected from the existing technology or the future technology, such as meshing, snap-fitting and other connection approaches that achieve cooperation by friction; according to the different cooperation approaches, a timing belt 110 corresponding to the cooperation approach is selected. For example, when selecting the meshing approach, a timing belt having a side surface provided with a connection structure such as a tooth shape or a slot may be selected, such as a trapezoidal tooth timing belt, an arc tooth timing belt, or other timing belts in the existing technology or in the future technology. When selecting the snap-fitting approach, a timing belt having a side surface provided with a slot structure or a protruding structure may be selected. The present disclosure does not limit thereto.

Alternatively, the timing belt pulley 142 with a tooth-shaped structure on an outer periphery may be configured to cooperate with the timing belt 110 with a tooth-shaped structure. When the timing belt pulley 142 rotates, the tooth-shaped structure of the timing belt pulley may cooperate with the tooth-shaped structure of the timing belt 110, so that the timing belt pulley moves along the timing belt 110, and the distribution trolley 130 moves along the timing belt 110. In this way, the transmission structure is relatively simple, and it is not easy to make mistakes.

The two ends of the timing belt 110 may be fixed by using approaches in the existing technology or in the future technology. For example, a timing belt fixing plate, a timing belt buckle, a timing belt fixing pulley or other apparatuses may be configured to fix the timing belt 110. The two ends of the timing belt may be fixed by using the same or different apparatuses, which is not limited in the present disclosure. Alternatively, the two ends of the timing belt may be fixed by using the same apparatus, so as to facilitate fixing and maintenance of the fixing apparatus of the timing belt.

FIG. 1A exemplarily shows the cooperation approach between the timing belt and the timing belt pulley. The fixing approach of the two ends of the timing belt 110 is described below by using one end 111 of the timing belt 110 for convenience of description. The fixing apparatus of the timing belt 110 is a timing belt buckle, and the timing belt buckle and the timing belt 110 are connected by using a cooperation approach in the existing technology or in the future technology, which is not limited in the present disclosure. The other end of the timing belt may be fixed by using the same or different approach, detailed description thereof will be omitted. By arranging the timing belt 110 using this approach, the stability of the timing belt may be improved, the convenience of fixing and maintaining the timing belt may be improved, and the cost of fixing the timing belt may be reduced.

Specifically, the trolley track 120 is arranged in parallel with the timing belt 110, and is configured to cooperate with the guide assembly 131 to guide the moving direction of the distribution trolley 130. The trolley tracks 120 may be arranged in one or more sets according to requirements, and needs to match with the arrangement of the guide assemblies 131, which is not limited in the present disclosure. The trolley track 120 may be a common track or a track provided with a guide member. When the trolley track is provided with the guide member, the guide member may cooperate with the guide assembly to limit a horizontal displacement and vertical displacement of the guide assembly on the track. For example, a shielding portion may be arranged on an outer side of the trolley track, so that the guide assembly moves under guidance of the shielding portion of the trolley track.

Specifically, the distribution trolley 130 may be a trolley that may be configured to carry and transport goods in the existing technology or in the future technology. For example, the distribution trolley may be a flatbed trolley or a van trolley that opens upward, or the like, which is not limited in the present disclosure.

The guide assembly may be arranged on the outside of the distribution trolley 130, and the guide assembly 131 may be an assembly configured to guide a moving direction of the distribution trolley in the existing technology or in the future technology, such as a suspension arm, or pulleys. The guide assemblies 131 may be arranged individually or in pairs, and are fixedly connected to the distribution trolley, which is not limited in the present disclosure. Alternatively, a pair of pulleys may be used as the guide assembly 131, and in this arrangement, the distribution trolley has high stability when moving along the trolley track.

For convenience of description, in the present embodiment, as shown in FIGS. 1A and 1B, a pair of independent pulleys is used as the guide assembly 131 to connect axles of the pulleys to the distribution trolley. A shape and a size of the pulley should be adapted to the trolley track 120, so that the pulleys may move along the trolley track 120.

As an exemplary embodiment, an individual suspension arm or a pair of suspension arms may also be used as the guide assembly 131. The suspension arm is fixedly connected to the distribution trolley 130, a bottom end of the suspension arm is fixedly connected to the distribution trolley 130, and the other end of the suspension arm has a snap-fit connection withs the track by using the existing technology or the future technology and moves along the track.

Figure 7:
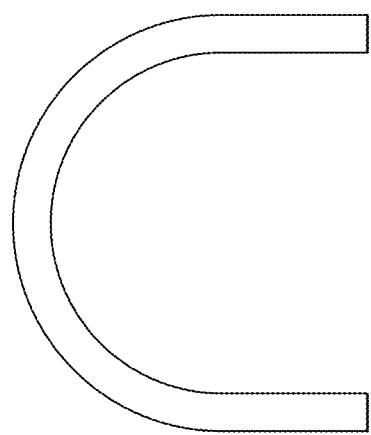
FIG. 7 is a schematic diagram of a C-shape cross section of a trolley track according to an embodiment of the present disclosure.

Using the trolley track 120 in FIG. 1 as an example, the bottom end of the suspension arm may be in a straight-line shape or a V shape, such that the entire suspension arm is in a T-shape, a Y-shape or a deformed shape. In order to cooperate with the guide assembly 131 which adopts the suspension arm, a cross section of the trolley track 120 may be for example in a C-shape as shown in FIG. 7, and the straight-line structure or the V-shaped structure at the bottom end of the suspension arm may be embedded into the trolley track 120, so that the guide assembly 131 of the distribution trolley 130 may be guided by the trolley track 120 to move. The bottom end of the suspension arm may alternatively be designed in a shape of ⊥, to cooperate with the trolley track 120, so that openings at two sides of ⊥ shape bottom end of the suspension arm respectively accommodate protruding ends of the C-shaped structure of the trolley track 120. In this way, the movement of the distribution trolley 130 may be restricted by the trolley track 120 and the guide assembly 131.

In the present embodiment, the driving assembly is arranged on the distribution trolley 130, and is configured to drive the distribution trolley 130 to move. The driving assembly includes the driving motor 141 and the timing belt pulley 142, the driving motor may be a power source to drive the trolley commonly used in the existing technology or in the future technology, such as a common DC motor and a common AC motor, which is not limited in the present disclosure. It may be understood that an axle of the timing belt pulley 142 is driven by the driving motor 141 to rotate.

It may be understood that the distribution trolley 130 further includes a driving motor power supply configured to supply power to the driving motor 141. The driving motor power supply is a power supply that cooperates with the driving motor and can provide electricity for the driving motor 141 in the existing technology or in the future technology, which is not limited in the present disclosure.

In the sorting apparatus provided by the embodiments of the present disclosure, at least one set of sorting units is arranged in the sorting apparatus. In the sorting unit, the trolley track is arranged in parallel with the timing belt whose two ends are fixed, the guide assembly of the distribution trolley cooperates with the trolley track, and may guide the moving direction of the distribution trolley. At the same time, the driving motor is configured to drive the timing belt pulley to rotate to make the timing belt pulley move along the timing belt. The sorting apparatus in the present embodiment may drive the distribution trolley to move accurately and efficiently along the timing belt, so as to obtain higher transmission efficiency. In addition, the distribution trolley independently transports to-be-sorted goods, which may realize independent sorting of the to-be-sorted goods, and improve the accuracy of goods sorting and the warehouse process efficiency while saving manual labor.

Figure 8:
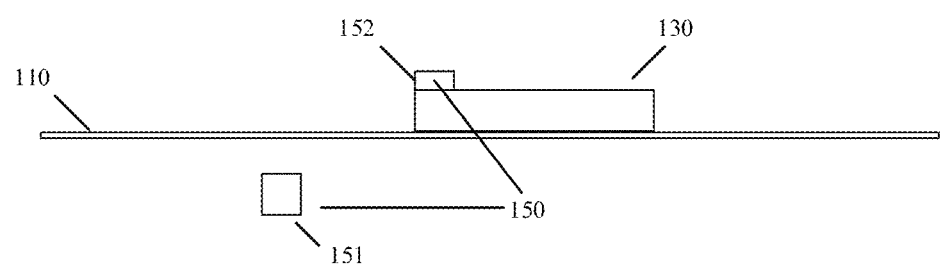
FIG. 8 is a schematic diagram of a sorting assembly according to an embodiment of the present disclosure.

In some alternative implementations of the present embodiment, in the sorting unit 100, at least one sorting assembly 150 may also be arranged as shown in FIG. 8, and the sorting assembly 150 is configured to: when the distribution trolley 130 transports to-be-sorted goods to a preset designated position, sort the to-be-sorted goods.

The sorting assembly 150 may include: a sensor 151, and a sorting element 152; the sensor 151 is configured to detect whether the distribution trolley 130 transports the to-be-sorted goods to the preset designated position; and the sorting element 152 is configured to sort the to-be-sorted goods to goods compartments, when the sensor 151 detects that the distribution trolley 130 transports the to-be-sorted goods to the preset designated position.

Specifically, the sensor 151 may be a sensor in the existing technology or in the future technology, which is not limited in the present disclosure. For example, a photosensitive sensor, a pressure-sensitive sensor, etc.

Specifically, the sorting element 152 may be a to-be-sorted element in the existing technology or in the future technology, which is not limited in the present disclosure. For example, a manipulator, a dump assembly of the distribution trolley, etc.

The sorting apparatus in the present embodiment, may provide the sorting assembly in the sorting unit, that is, provide the sensor and the sorting element, to detect an operating state of the distribution trolley, and may sort the goods carried on the trolley, when the trolley reaches the preset designated position, which realizes automatic sorting of the to-be-sorted goods, saves labor costs and improves sorting efficiency.

In some alternative implementations of the present embodiment, the sensor is a pressure-sensitive sensor, and the pressure-sensitive sensor 151 is arranged under the timing belt 110.

Specifically, a moving trajectory of the trolley may correspond to the timing belt 110, a position on the timing belt 110 may be determined as the preset designated position, and after the position on the timing belt 110 corresponding to the preset designated position is determined, the sensor 151 may be arranged under the position, that is, under the timing belt. Alternatively, the pressure-sensitive sensor is arranged in the position, and when the distribution trolley moves to the position, a change in weight of the timing belt may be used to detect whether the distribution trolley moves to the preset designated position. By using the sorting apparatus in the present embodiment, a better detection of the operating state of the distribution trolley is achieved on the basis of saving space.

Figure 2:
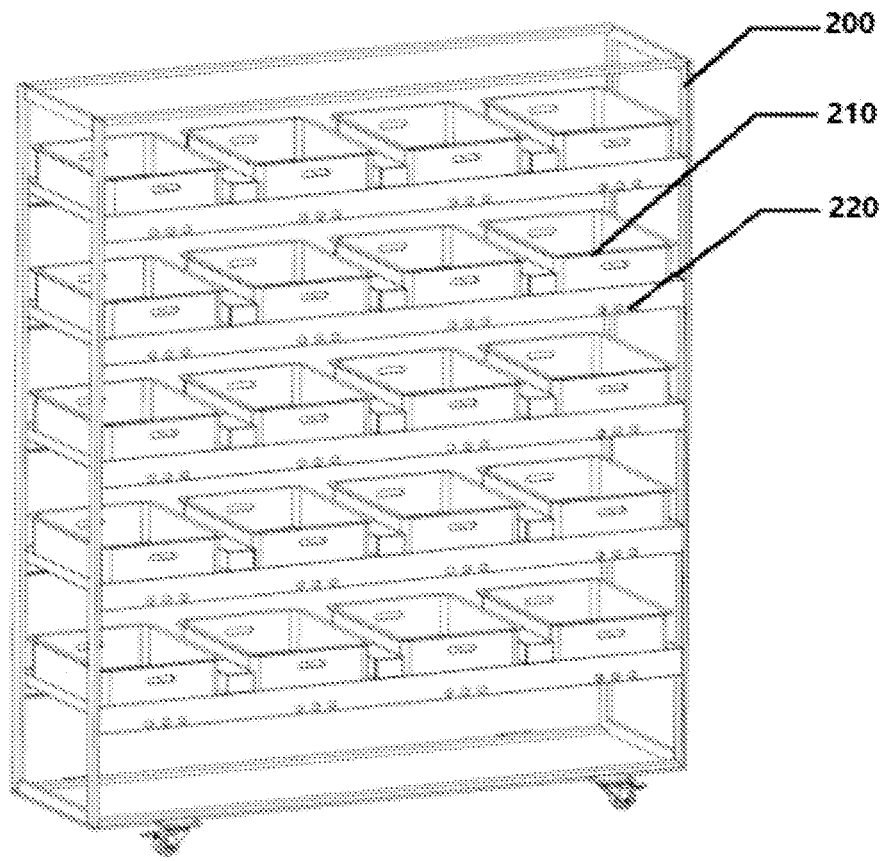
FIG. 2 is a schematic structural diagram of a goods shelf in the sorting apparatus according to the present disclosure.

In some alternative implementations of the present embodiment, as shown in FIG. 2, the sorting apparatus further includes a goods shelf 200, and the goods shelf 200 includes a plurality of goods compartments 210.

Specifically, the sorting apparatus further includes the goods shelf 200, and the goods shelf 200 includes more than one goods compartment 210. The goods compartment 210 is configured to carry sorted goods, and a shape of the goods compartment 210 should be easy to carry to-be-loaded goods. Here, the number of the goods compartments 210 may be set according to user needs. In the existing technology or in the future technology, the goods compartments 210 and the goods shelf may be arranged integrally, or the goods compartments may be independent of the goods shelf and may be disassembled from the goods shelf, which is not limited in the present disclosure.

Alternatively, the goods compartments 210 are independent of the goods shelf 200. When the goods compartments 210 are independent of the goods shelf 200 and can be disassembled from the goods shelf, any one of the goods compartments 210 in the goods shelf 200 may be replaced.

Alternatively, the goods shelf 200 may be a movable goods shelf, so that when the goods shelf 200 is full of goods, it may be replaced, or moved using a manual or automated approach in the existing technology.

Alternatively, a plurality of sets of goods shelves 200 may also be set, and may be replaced after the collection of goods is completed, so as to facilitate subsequent packing.

The sorting apparatus in the present embodiment is provided with the goods shelf including the goods compartments, which may save space and facilitate storing more goods.

In some alternative implementations of the present embodiment, as shown in FIG. 2, an indicator 220 is arranged at an opening position of the goods compartment 210, the indicator 220 is configured to display a collection state of the goods compartment 210, and the collection state includes but is not limited to: no goods, full goods, and abnormal.

Specifically, the indicator 220 may be an indicator in the existing technology or in the future technology, such as a three-color light, or a display screen. The indicator 220 is arranged in a one-to-one correspondence with the goods compartment 210. In a specific example, a three-color light is used as the indicator 220, the three-color light is configured to use lights of different colors to indicate the collection state of the goods compartment 210, and the collection state includes but is not limited to: no goods, full goods, and abnormal.

The sorting apparatus in the present embodiment provides the indicator at the opening position of the goods compartment to better obtain the collection state of the goods compartment, which may facilitate subsequent adjustment operations on the goods compartment and improve service efficiency of the goods s compartment.

Figure 3:
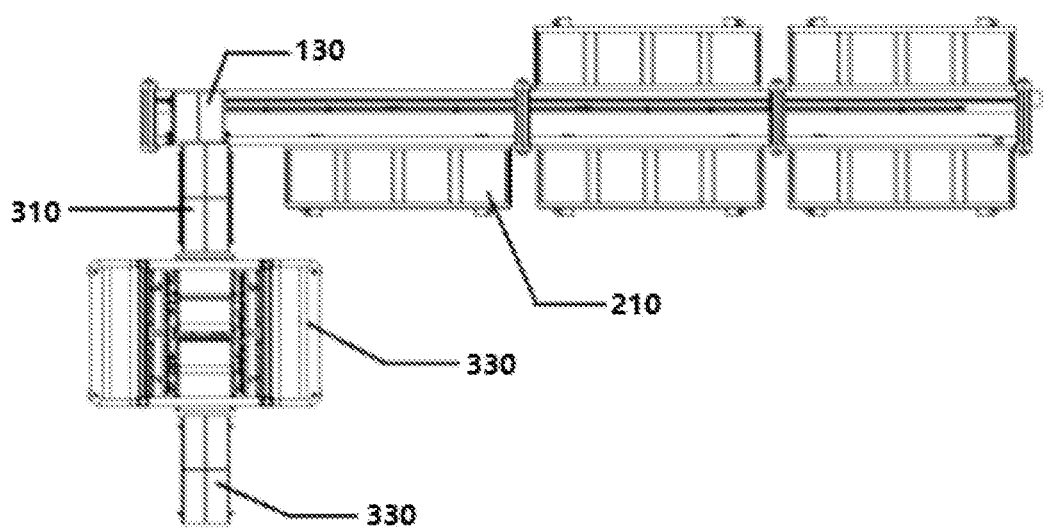
FIG. 3 is a schematic structural diagram of a sorting apparatus according to another embodiment of the present disclosure.

In some alternative implementations of the present embodiment, as shown in FIG. 3, the sorting apparatus further includes a buffer storage position 310. The buffer storage position 310 corresponds to a preset starting position of the distribution trolley 130, and is configured to store the to-be-sorted goods.

Specifically, the buffer storage position 310 is an object or field for accommodating the to-be-sorted goods, and the buffer storage position 310 is arranged at a position corresponding to the preset starting position of the distribution trolley 130.

The sorting apparatus in the present embodiment may pre-store the to-be-sorted goods through the buffer storage position, so as to ensure continuity of a sorting process and improve the sorting efficiency.

In some alternative implementations of the present embodiment, as shown in FIG. 3, the sorting apparatus further includes a parcel loading position 320 and an elevator 330, the parcel loading position 320 is configured to load the to-be-sorted goods for the elevator 330; and the elevator 330 is configured to transfer the to-be-sorted goods from the parcel loading position 320 to the buffer storage position 310.

Specifically, the parcel loading position 320 is configured to provide the elevator 330 with the to-be-sorted goods, and then the to-be-sorted goods are lifted from the parcel loading position 320 to the buffer storage position 310 by the elevator 330. The elevator 330 may be an elevator in the existing technology or an elevator in the future technology, for example, the elevator may be a continuous elevator, a bucket elevator, or the like.

Alternatively, the elevator 330 may be provided with a plurality of conveying units, so that the to-be-sorted goods may be continuously lifted from the parcel loading position 320 to the buffer storage position 310.

Alternatively, the elevator 330 may be provided with a plurality of conveying units, and a distance between every two of the plurality of conveying units is equal to a distance between two adjacent buffer storage positions arranged top to bottom and at intervals, so as to continuously convey the to-be-sorted goods to different buffer storage positions 310, improving transmission efficiency.

The sorting apparatus in the present embodiment may connect the parcel loading position to the buffer storage position through the elevator in an operation process of the to-be-sorted goods, so as to provide the to-be-sorted goods for the buffer position, that is, the sorting unit.

In some alternative implementations of the present embodiment, the distribution trolley 130 is also provided with a tensioning pulley 132 and a tensioning pulley 133, respectively arranged on the left and right sides of the timing belt pulley 142 and located on the side where the timing belt 110 does not cooperate with the timing belt pulley 142, and configured to tension the timing belt 110.

Specifically, as shown in FIG. 1A, the tensioning pulley 132 and the tensioning pulley 133 are arranged at positions corresponding to and cooperating with the timing belt pulley 142 and the timing belt 110 on the distribution trolley 130. Both of the tensioning pulley 132 and the tensioning pulley 133 may be tensioning pulleys composed of friction units, torsion springs, bearings, belt pulleys and some members in the existing technology or in the future technology, are respectively arranged on the left and right sides of the timing belt pulley 142 and located on the side where the timing belt 110 does not cooperate with the timing belt pulley 142, and configured to tension the timing belt 110, so s that the timing belt 110 may better cooperate with the timing belt pulley 142.

The sorting apparatus in the present embodiment may improve a cooperation effect of the timing belt and the timing belt pulley by means of tensioning the timing belt when the distribution trolley is moving, so as to improve the stability of the movement of the distribution trolley, improve the transmission efficiency of the distribution trolley, and improve a moving speed of the distribution trolley.

In some alternative implementations of the present embodiment, as shown in FIG. 1B, a sliding wire collector 134 is provided in the distribution trolley, which is respectively connected with a sliding wire and the driving motor 141, so that power may be taken from the sliding wire and supply the power to the driving motor 141. By selecting the sliding wire collector as a power source of the driving motor, the sliding wire collector may be well adapted to the design of the distribution trolley due to its small size and light weight, providing better driving energy for the driving motor to ensure stable operation of the driving motor.

In some alternative implementations of the present embodiment, the sorting unit further includes: a detection assembly, configured to detect whether the distribution trolley 130 is at the preset starting position.

Specifically, the detection assembly 400 may be an assembly commonly used in the existing technology or in the future technology for object position detection. Assemblies such as photosensitive sensors or pressure-sensitive sensors may be used to achieve the purpose, and the purpose may also be achieved by using an arrangement of multiple-assembly cooperation, which is not limited in the present disclosure. The detection assembly 400 sends a signal when the distribution trolley is in the preset starting position.

The sorting apparatus in the present embodiment detects whether the distribution trolley is in the preset staring position by providing the detection assembly, and when it detects that the distribution trolley is in the starting position, the sorting apparatus provides the distribution trolley with the to-be-sorted goods to realize an automatic sorting process.

In some alternative implementations of the present embodiment, the detection assembly includes: an in-situ detection board 410 and a trolley proximity switch 420; a disposition position of the in-situ detection board 410 corresponds to the preset starting position of the distribution trolley 130, and the trolley proximity switch 420 is arranged on the distribution trolley 130 and at a position corresponding to the in-situ detection board.

Specifically, the in-situ detection board is arranged corresponding to the preset starting position of the distribution trolley 130, the trolley proximity switch 420 corresponding to the in-situ detection board is arranged on the distribution trolley 130, and the two assemblies cooperate with each other to detect whether the distribution trolley is in the preset starting position.

Figure 4:
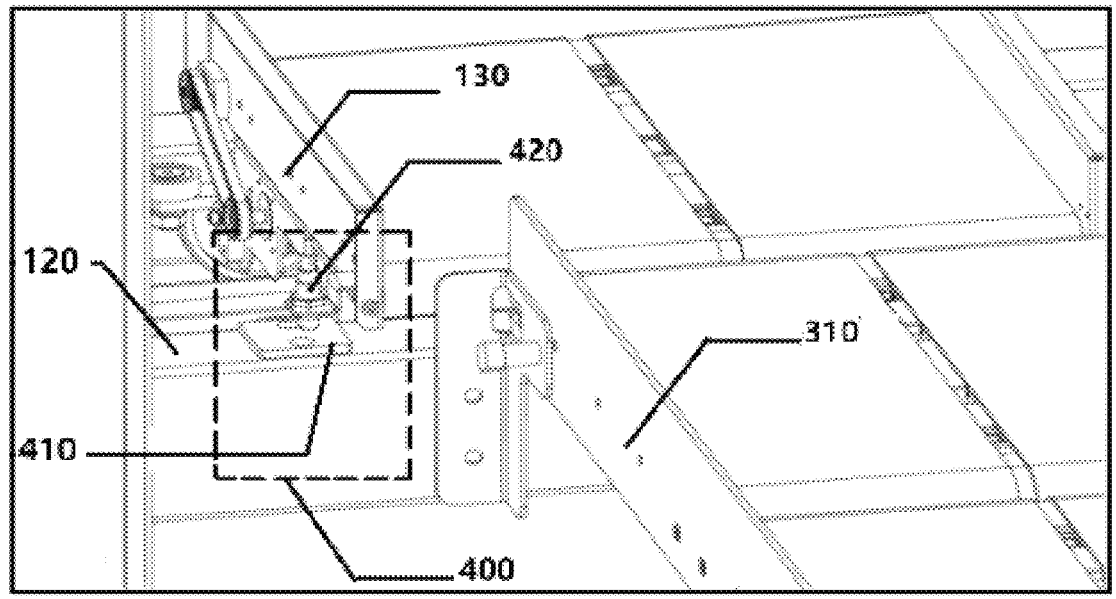
FIG. 4 is a schematic partial diagram of a detection assembly of the sorting apparatus according to an embodiment of the present disclosure.

Alternatively, as shown in FIG. 4, the in-situ detection board 410 is arranged on the trolley track 120. When the distribution trolley 130 is close to the preset starting position, the trolley proximity switch 420 is close to the in-situ detection board 410. When the distribution trolley 130 is in the preset starting position, the trolley proximity switch 420 touches the in-situ detection board 410, indicating that the distribution trolley 130 is in the preset starting position.

The sorting apparatus in the present embodiment uses the cooperation of the in-situ detection board and the trolley proximity switch to realize accurate detection of whether the distribution trolley is in the preset starting position, and the arrangement structure is simple. When detecting that the distribution trolley is in the starting position, the sorting apparatus may provide the distribution trolley with the to-be-sorted goods, which improves service efficiency of the distribution trolley and the sorting efficiency.

In some alternative implementations of the present embodiment, a tensioning assembly is arranged at the two ends of the timing belt 110, and configured to tension the timing belt 110.

Specifically, the timing belt 110 in the sorting unit further includes the tensioning assembly, and the tensioning assembly is a commonly used tensioning assembly in the existing technology or in the future technology. Typically, a surface of the tensioning assembly has a structure that cooperates with the timing belt, for example, when a surface of the timing belt is provided with a tooth shaped structure, the outer surface of the tensioning assembly is provided with a corresponding tooth shaped structure to realize the cooperation between the tensioning assembly and the timing belt, and to realize tensioning by rotating the tensioning assembly.

Alternatively, two tensioning pulleys that cooperate with the timing belt 110 are arranged at the positions where the timing belt 110 is fixed, so as to realize tensioning of the timing belt.

The sorting apparatus in the present embodiment are provided with the tensioning assemblies arranged at the two ends of the timing belt. This structure is relatively simple, and the timing belt may be quickly tensioned, so that the transmission efficiency of the timing belt is better, thereby improving an operation efficiency of the distribution trolley and improve the sorting efficiency.

In some alternative implementations of the present embodiment, the tensioning assembly includes: a ratchet turning gear apparatus.

Figure 5:
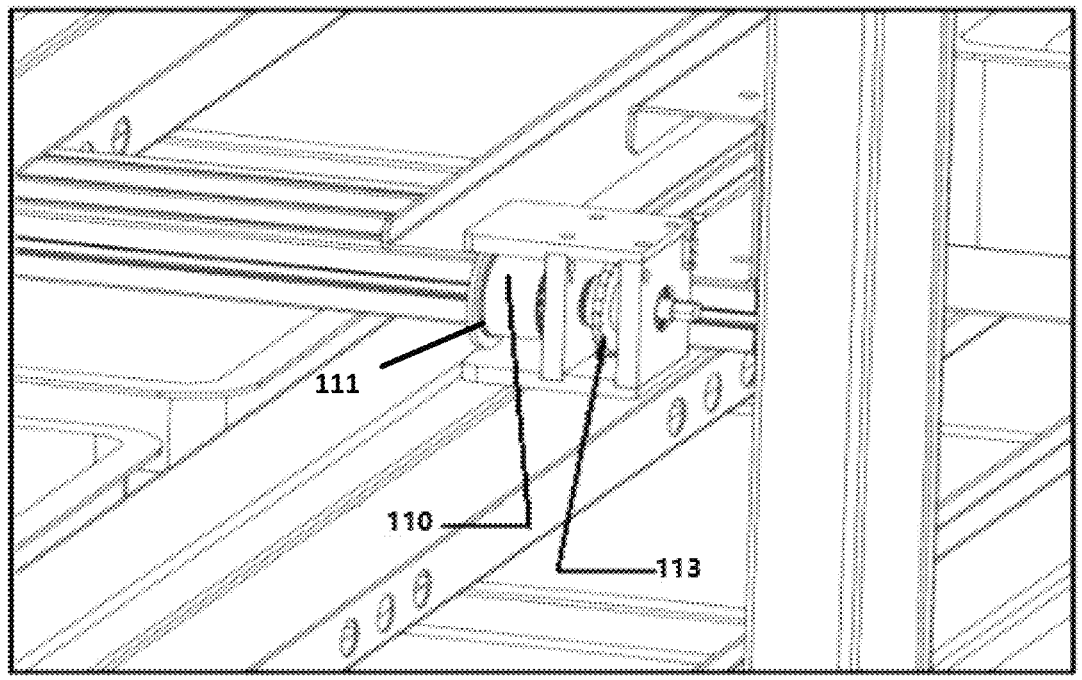
FIG. 5 is a schematic partial diagram of a fixed end of a timing belt of the sorting apparatus according to an embodiment of the present disclosure.

Specifically, as shown in FIG. 5, using one end 111 of the timing belt 110 as an example, the tensioning assembly 113 uses the ratchet turning gear apparatus, the ratchet turning gear apparatus is arranged on the fixed end 111, and the ratchet turning gear apparatus cooperates with the timing belt 110, so as to realize tensioning of the timing belt 110 by adjusting the ratchet turning gear apparatus.

The sorting apparatus in the present embodiment uses the ratchet turning gear apparatus as the tensioning assembly to tension the timing belt, which may make the transmission efficiency of the timing belt better, so as to improve the operation efficiency of the distribution trolley and improve the sorting efficiency.

In some alternative implementations of the present embodiment, the sorting apparatus further includes: a trolley track shelf 600, one or more sorting units 100 are arranged in parallel from top to bottom in the trolley track shelf 600.

Figure 6:
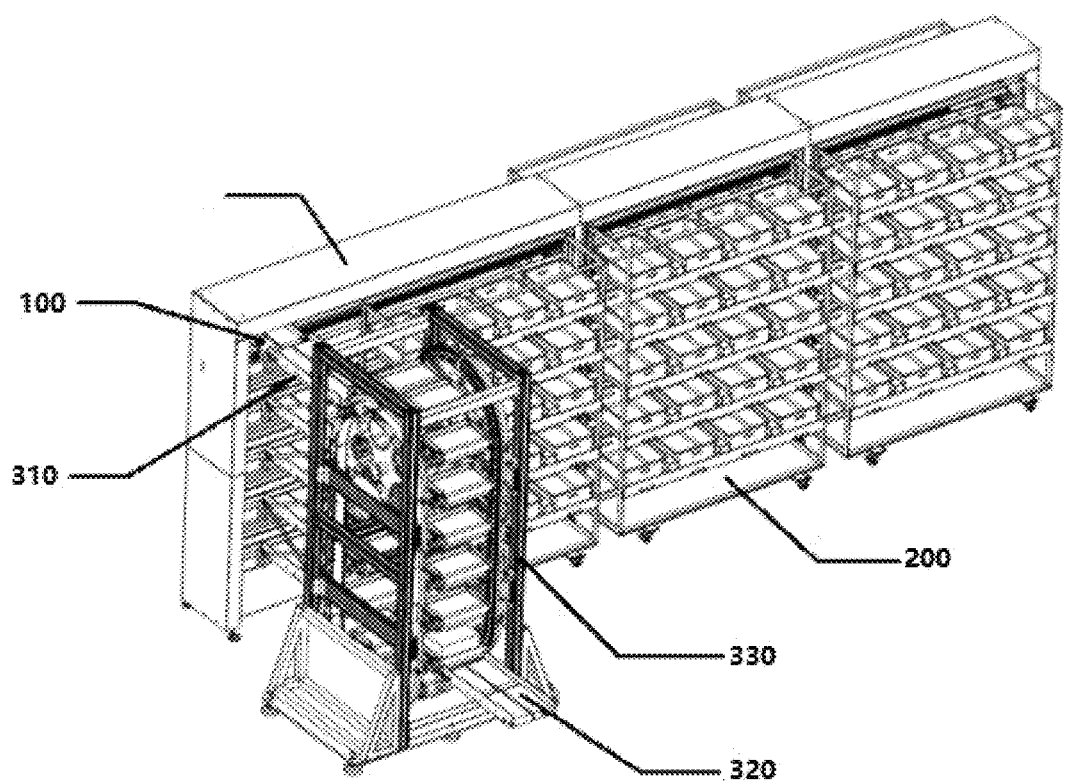
FIG. 6 is a schematic structural diagram of a sorting apparatus according to yet another embodiment of the present disclosure.

Specifically, as shown in FIG. 6, the trolley track shelf 600 is a common frame structure in the existing technology or in the future technology, a size of the trolley track shelf 600 is adapted to a size of the sorting unit 100, so that more than one sorting unit is arranged in parallel from top to bottom. FIG. 6 exemplarily illustrates that a plurality of sorting units 100 parallel to each other are arranged from top to bottom in the trolley track shelf 600.

In a specific example, a length of the trolley track shelf is not more than 10 meters. When this form is adopted, the floor space is small, the arrangement structure is relatively simple, and the sorting process is short, which may better achieve the purpose of the present disclosure.

The sorting apparatus in the present embodiment may arrange a plurality of sorting units 100 in the trolley track shelf 600, so as to realize simultaneous operation of the plurality of sorting units, which may not only save floor space, but also greatly improve the sorting efficiency.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A sorting apparatus, comprising:
at least one set of sorting units; wherein a sorting unit of the at least one set of sorting units comprises:
a timing belt, wherein two ends of the timing belt are fixed;
a trolley track arranged in parallel with the timing belt; and
a distribution trolley, wherein the distribution trolley comprises a driving assembly and a guide assembly, the driving assembly comprises a driving motor and a timing belt pulley, the driving motor drives the timing belt pulley to cooperate with the timing belt and to move along the timing belt; and the guide assembly of the distribution trolley is configured to cooperate with the trolley track to guide a moving direction of the distribution trolley.

2. The sorting apparatus according to claim 1, wherein the trolley track comprises:
a C-shaped track, and a cross section of the C-shaped track is C-shaped.

3. The sorting apparatus according to claim 1, wherein the sorting unit further comprises:
a sorting assembly, configured to, when the distribution trolley transports to-be-sorted goods to a preset designated position, sort the to-be-sorted goods.

4. The sorting apparatus according to claim 3, wherein the sorting assembly comprises:
a sensor, and a sorting element;
the sensor is configured to detect whether the distribution trolley transports the to-be-sorted goods to the preset designated position; and
the sorting element is configured to sort the to-be-sorted goods to goods compartments, when the sensor detects that the distribution trolley transports the to-be-sorted goods to the preset designated position.

5. The sorting apparatus according to claim 4, wherein the sensor is a pressure-sensitive sensor, and the pressure-sensitive sensor is arranged under the synchronous belt.

6. The sorting apparatus according to claim 4, wherein the sorting apparatus further comprises:
a goods shelf, comprising the goods compartments.

7. The sorting apparatus according to claim 4, wherein an indicator is arranged at an opening position of the goods compartment, the indicator is configured to display a collection state of the goods compartment, and the collection state comprises no goods, full goods, or abnormal.

8. The sorting apparatus according to claim 1, wherein the sorting apparatus further comprises:
a buffer storage position, corresponding to a preset starting position of the distribution trolley, and configured to store the to-be-sorted goods.

9. The sorting apparatus according to claim 8, further comprising:
a parcel loading position and an elevator;
the parcel loading position is configured to load the to-be-sorted goods; and the elevator is configured to transfer the to-be-sorted goods from the parcel loading position to the buffer storage position.

10. The sorting apparatus according to claim 1, wherein the distribution trolley further comprises:
   two tensioning pulleys, respectively arranged on left and right sides of the timing belt pulley and located on a side where the timing belt does not cooperate with the timing belt pulley, and configured to tension the timing belt.

11. The sorting apparatus according to claim 1, wherein the distribution trolley further comprises:
   a sliding wire collector, configured to take power from a sliding wire and supply the power to the driving motor.

12. The sorting apparatus according to claim 8, wherein the sorting unit further comprises:
   a detection assembly, configured to detect whether the distribution trolley is at the preset starting position.

13. The sorting apparatus according to claim 12, wherein the detection assembly comprises:
   an in-situ detection board and a trolley proximity switch;
   a disposition position of the in-situ detection board corresponds to the preset starting position of the distribution trolley; and
   the trolley proximity switch is arranged on the distribution trolley and at a position corresponding to the in-situ detection board.

14. The sorting apparatus according to claim 1, wherein the sorting unit comprises:
   a tensioning assembly, arranged at the two ends of the timing belt, and configured to tension the timing belt.

15. The sorting apparatus according to claim 14, wherein the tensioning assembly comprises:
   a ratchet turning gear apparatus.

16. The sorting apparatus according to claim 1, wherein the sorting apparatus further comprises:
   a trolley track shelf, wherein more than one set of sorting units are arranged in parallel from top to bottom in the trolley track shelf.

* * * * *